United States Patent [19]

Steininger

[11] Patent Number: 4,994,330
[45] Date of Patent: Feb. 19, 1991

[54] MAGNETOOPTIC RECORDING MEDIUM CONTAINING A MULTILAYER PROTECTION FILM WITH AT LEAST ONE TRANSITION ZONE BETWEEN THE PROTECTION LAYERS

[75] Inventor: Helmut Steininger, Worms, Fed. Rep. of Germany

[73] Assignee: BASF Aktiengesellschaft, Ludwigshafen, Fed. Rep. of Germany

[21] Appl. No.: 492,211

[22] Filed: Mar. 13, 1990

Related U.S. Application Data

[63] Continuation of Ser. No. 193,678, May 13, 1988, abandoned.

[30] Foreign Application Priority Data

May 19, 1987 [DE] Fed. Rep. of Germany ....... 3716736

[51] Int. Cl.$^5$ .............................................. G11B 11/00
[52] U.S. Cl. ..................... 428/336; 428/694; 428/900
[58] Field of Search ....................... 428/694, 900, 928

[56] References Cited

U.S. PATENT DOCUMENTS

| | | | |
|---|---|---|---|
| 4,579,777 | 4/1986 | Honguu et al. | 428/336 |
| 4,637,953 | 1/1987 | Sawamura et al. | 428/333 |
| 4,649,451 | 3/1987 | Tomita | 360/131 |
| 4,658,388 | 4/1987 | Ishiwatari et al. | |
| 4,666,709 | 5/1987 | Gueugnon et al. | 428/611 |
| 4,695,510 | 9/1987 | Sawamura et al. | 428/336 |
| 4,711,821 | 12/1987 | Kikuchi et al. | 428/457 |

Primary Examiner—George F. Lesmes
Assistant Examiner—Dennis Carmen
Attorney, Agent, or Firm—Keil & Weinkauf

[57] ABSTRACT

In a sheet-like, multilayer, magneto-optical recording material which has a base which is transparent to light, a thermally alterable recording layer of an amorphous lanthanide transition metal alloy and, on the base remote side of this recording layer, an anticorrosion layer containing carbides, nitrides and/or oxides, the anticorrosion layer
(a) is from 30 to 250 nm thick and
(b) consists of two or more components which
(c) are present in four or more separate strata, each consisting of one of the components,
(d) one or more of the components being selected from the group consisting of the elements boron, aluminum, silicon, titanium, zirconium, hafnium, vanadium, niobium, tantalum, chromium, molybdenum and tungsten and
(e) one or more of the other components being selected from the group consisting of the carbides, nitrides and oxides of these elements (d) and
(f) directly adjacent strata always consisting of components which differ from one another.

14 Claims, No Drawings

MAGNETOOPTIC RECORDING MEDIUM CONTAINING A MULTILAYER PROTECTION FILM WITH AT LEAST ONE TRANSITION ZONE BETWEEN THE PROTECTION LAYERS

This application is a continuation of application Ser. No. 07/193,678, filed on May 13, 1988, now abandoned.

The present invention relates to a novel, sheet-like, multilayer, magneto-optical recording material which has a base which is transparent to light, a thermally alterable recording layer of an amorphous lanthanide transition metal alloy and, on the base remote side of this recording layer, an anticorrosion layer containing carbides, nitrides and/or oxides.

Recording materials of this type are disclosed in, for example, DE-A-33 35 689. In these materials, the recording layer is from 20 to 100 nm thick. On their base remote side, they have three layers, each of which has a defined function. Thus, the first layer consists of a material which has a high refractive index of 2.0 or more, for example titanium oxide, cerium oxide, antimony oxide, tungsten oxide, silica, bismuth oxide or cadmium oxide, and serves as an interference film. The second layer consists of metals such as copper, silver, chromium, aluminum, rhodium, gold or nickel and is a reflective layer. The uppermost layer is an antioxidation layer and consists of magnesium oxide, alumina, silica, titanium oxide or thorium oxide.

The recording materials disclosed in DE-A-35 34 571 have a similar structure. In these materials, the first of the layers applied to the recording layer consists of a mixture of silicon carbide and silicon nitride or silicon carbide and aluminum nitride and serves both as a protective layer and as an interference layer. A reflective layer consisting of a metal, such as copper, aluminum or gold, is provided as the second layer. An anticorrosion layer may also be present. The recording material may contain further auxiliary layers, such as an interference layer of silica, magnesium fluoride, niobium oxide, tantalum oxide, alumina, aluminum nitride or silicon nitride.

In addition, DE-A-35 00 314 discloses a recording material which has a layer of an oxide/nitride mixture, the said layer serving both as an anticorrosion layer and as an interference film.

These known recording materials are used for recording and reading data with the aid of pulse-coded laser beams which are focused on the recording layer and strike them at right angles.

In recording or writing data, an auxiliary magnetic field is applied to the recording materials, the field lines of the said field being aligned at right angles to the surface of the recording layers.

It is known that the recording layers which consist of the amorphous, ferrimagnetic lanthanide transition metal alloys and are magnetized at right angles to their surface are heated at the point of contact by the laser beam during writing of the data. As a result of heating, the coercive force $H_c$ of the alloys decreases. If the coercive force $H_c$ falls below the field strength of the applied auxiliary magnetic field at a critical temperature dependent on the particular alloy used, an area which has a magnetization direction opposite to the original direction is formed at the point of contact. Such an area is also referred to as a spot.

The data are read using linearly polarized light of a continuously emitting continuous-wave laser whose light output is not sufficient to heat the material above the critical temperature. This laser beam is reflected either by the recording layer itself or by a reflective layer arranged behind it, an interaction occurring between the magnetic moments in the recording layer and the magnetic vector of the laser light wave. As a result of this interaction, the plane of polarization $\overline{E}$ of the laser light, which is reflected by a spot or by a reflective layer located behind, is rotated through a small angle from the original plane. If this rotation of the plane of polarization $\overline{E}$ occurs during reflection of the light by the recording layer itself, this effect is referred to as the Kerr effect and the angle of rotation accordingly as the Kerr angle of rotation; if, on the other hand, the plane is rotated when the light passes twice through the recording layer, the terms Faraday effect and Faraday angle of rotation are used.

This rotation of the plane of polarization $\overline{E}$ of the laser light reflected by the recording material can be measured with the aid of suitable optical and electronic apparatuses and converted into signals.

If the Faraday effect is utilized in the case of the known recording materials, the said materials must contain a reflective layer since the recording layers as such are transparent to light. Moreover, interference layers must be present to prevent troublesome diffraction phenomena at the boundary between the reflective layer and the recording layer. Of course, such layers also act as oxygen barriers which to a certain extent prevent corrosion of the extremely oxygen-sensitive and water-sensitive recording layer. However, they do not perform this function to an extent sufficient for practical purposes, so that it is also necessary to use anticorrosion layers which seal the recording material from the air.

The known combination of an interference film, a reflective layer and an antioxidation layer must not be regarded as a single anticorrosion layer composed of a plurality of separate strata, because its structure and its composition are mainly determined by the other functions.

The known combination has disadvantages with regard to the anticorrosion effect. In particular, its action as an oxygen barrier is unsatisfactory unless it contains a comparatively thick layer of, for example, alumina on the air side. Moreover, the choice of the components of the other layers, which is made from other points of view, has disadvantages with regard to the adhesion of the layers to one another, the shelf life, the internal stress or the mechanical strength. For example, a known combination which may be optimum with respect to interference and reflection can have a poor anticorrosion action. Alternatively, its anticorrosion action may be satisfactory but its shelf life unsatisfactory. If components are chosen which give a particularly hard upper layer, the known layer combination may be so brittle overall that it fragments as a result of slight mechanical vibrations. Furthermore, internal stresses may give rise to cracks. All this has an adverse effect on the anticorrosion action.

However, it is precisely for the recording materials under discussion that corrosion protection is of fundamental importance, because their recording layers are extremely rapidly destroyed by water and/or atmospheric oxygen, resulting in complete loss of the data recorded therein.

It is an object of the present invention to provide a novel, sheet-like, multilayer, magneto-optical recording material which has a base which is transparent to light, a thermally alterable recording layer of an amorphous lanthanide transition metal alloy and, on the base remote side of this recording layer, an anticorrosion layer containing carbides, nitrides and/or oxides, and which no longer has the disadvantages of the known recording materials.

We have found that this object is achieved, according to the invention, by a novel, sheet-like, multilayer, magneto-optical recording material which has a base which is transparent to light, a thermally alterable recording layer of an amorphous lanthanide transition metal alloy and, on the base remote side of this recording layer, an anticorrosion layer containing carbides, nitrides and/or oxides, and wherein the anticorrosion layer (a) is from 30 to 250 nm thick and
(b) consists of two or more components which
(c) are present in four or more separate strata, each consisting of one of the components,
(d) one or more of the components being selected from the group consisting of the elements boron, aluminum, silicon, titanium, zirconium, hafnium, vanadium, niobium, tantalum, chromium, molybdenum and tungsten and
(e) one or more of the other components being selected from the group consisting of the carbides, nitrides and oxides of these elements (d) and
(f) directly adjacent strata always consisting of components which differ from one another.

The multistratum layers containing carbides, nitrides and/or oxides as well as elements and to be used according to the invention serve exclusively for protecting the recording layers of the novel, sheet-like, multilayer, magneto-optical recording materials from corrosion. They are therefore referred to as anticorrosion layers.

The term sheet-like covers all spatial forms whose thickness is substantially smaller than their length and width. The novel recording materials may accordingly be belt-like, plate-like or disk-like, the disk-like recording materials, which are generally referred to as disks, being advantageous.

The term multilayer indicates that the novel recording material is composed of the base, the recording layer and the multistratum anticorrosion layer and, if necessary, further layers which likewise assist the function of the recording material.

The anticorrosion layers to be used according to the invention are up to 250 nm thick. Because of their particular properties, greater layer thicknesses are unnecessary. Furthermore, the greater material consumption required for this purpose has no further particular advantages. The thickness of the novel anticorrosion layers should not be less than 30 nm since their barrier action with respect to oxygen and water is then no longer completely satisfactory. Thicknesses of from 50 to 100 nm are advantageous. In this thickness range, the novel anticorrosion layers have an optimum property profile with respect to the barrier action, the material consumption, the production cost, the mechanical strength, the toughness and the shelf life.

The anticorrosion layers used according to the invention consist of four or more separate strata of two or more components.

In most cases, four or five separate strata are sufficient for obtaining an optimum property profile, anticorrosion layers consisting of six, seven or eight strata being used in special cases. Anticorrosion layers consisting of nine, ten or more strata are more rarely used because the higher production cost entailed here is not justified by a further increase in the properties, which as such are already particularly advantageous. Hence, anticorrosion layers consisting of four or five strata are especially advantageous since they can be produced at very low cost and already have optimum properties.

The strata of the novel anticorrosion layers may have different thicknesses. However, it is advantageous if they have about the same thickness.

Each separate stratum always consists of one component, the components of adjacent strata always differing from one another. A total of as few as two components are sufficient for producing the anticorrosion layer and for obtaining the desired advantageous properties. According to the invention, however, three components are advantageous because they permit the property profile to be most readily optimized at a comparatively low production cost. Four, five or six components are more rarely used because this results in only a comparatively small improvement in the advantageous properties.

The transition from one stratum to the next may be abrupt, i.e. there may be an exactly defined boundary between the strata, as, for example, in the transition from a stoichiometric carbide, nitride or oxide stratum to a pure metal stratum. However, the transition may also be poorly defined, i.e. instead of a sharp boundary, there may be a more or less broad transition zone between the strata. For example, a stoichiometric carbide, nitride or oxide stratum may become a pure metal stratum via a zone of substoichiometric composition in which the concentration of the carbon, nitrogen or oxygen decreases more or less rapidly and the metal concentration increases more or less rapidly. It is also possible, for example, for oxide strata to be followed abruptly, or gradually become, carbide or nitride strata.

According to the invention, the gradual transition from one stratum to the next is advantageous, and is particularly advantageous if there is a transition from the oxide, carbide or nitride strata to metal strata and correspondingly from the metal strata to oxide, carbide or nitride strata.

The theoretical boundary between two strata having a gradual transition is taken as that plane in the transition zone in which the carbon, nitrogen or oxygen content of a carbide, nitride or oxide stratum just reaches 50% of the relevant stoichiometric value. The thickness of such a stratum therefore extends from one theoretical boundary to the next.

The thickness of a transition zone is regarded as the distance from the plane in which the carbon, nitrogen or oxygen content of a carbide, nitride or oxygen layer just reaches 90% of the stoichiometric value to the plane in which this value is just 10%. The two parts of a transition zone in two strata may have different thicknesses. The thickness of such a part in a stratum should not be more than 75%, preferably 50%, advantageously 30%, in particular 10%, of the thickness of the stratum.

The uppermost stratum of the anticorrosion layers to be used according to the invention may be a carbide, nitride, oxide or element stratum. Carbide, nitride or oxide strata are advantageous, the last-mentioned strata being particularly advantageous. It is very particularly advantageous if the stratum below the oxide stratum is an element stratum.

The components of the anticorrosion layers are always selected from two groups, one of these groups consisting of the elements boron, aluminum, silicon, titanium, zirconium, hafnium, vanadium, niobium, tantalum, chromium, molybdenum and tungsten and the other group consisting of the carbides, nitride and oxides of these elements, i.e. boron carbide, aluminum carbide, silicon carbide, titanium carbide, zirconium carbide, hafnium carbide, vanadium carbide, niobium carbide, tantalum carbide, chromium carbide, molybdenum carbide and tungsten carbide, boron nitride, aluminum nitride, silicon nitride, titanium nitride, zirconium nitride, hafnium nitride, vanadium nitride, niobium nitride, tantalum nitride, chromium nitride, molbydenum nitride and tungsten nitride and boron oxide, alumina, silica, titanium oxide, zirconium oxide, hafnium oxide, vanadium oxide, niobium oxide, tantalum oxide, chromium oxide, molybdenum oxide and tungsten oxide. A particular element or two or more particular elements and the carbides, nitrides or oxides of the same or other elements may be selected for the production of the anticorrosion layer. It is advantageous to use only one element, in which case the carbides, the nitrides and/or oxides of this single element are particularly advantageously used.

Advantageous anticorrosion layers to be used according to the invention contain aluminum, silicon or titanium and boron carbide, aluminum carbide, silicon carbide or titanium carbide, boron nitride, aluminum nitride, silicon nitride or titanium nitride or alumina, silica or titanium oxide as components.

Particularly advantageous anticorrosion layers consist of aluminum, silicon or titanium and aluminum carbide, silicon carbide or titanium carbide or aluminum nitride, silicon nitride or titanium nitride and alumina, silica or titanium oxide.

Very particularly advantageous anticorrosion layers consist of aluminum, aluminum nitride and alumina or of silicon, silicon carbide and/or silicon nitride and silica.

The anticorrosion layers to be used according to the invention can be produced by a conventional technique for the production of thin layers by vapor deposition, reactive vapor deposition, ion plating, ion cluster beam deposition (ICB) or cathode sputtering, including reactive cathode sputtering. Cathode sputtering is preferably used. For this purpose, the appropriate metals, oxides, nitrides and/or carbides in pure form can be sputtered in the desired sequence and amount, under highly reduced pressure, from a target and deposited on suitable bases or layers already present thereon. Alternatively, the anticorrosion layer can be built up in the desired manner by sputtering the pure metal and mixing the desired amount of oxygen, nitrogen or carbon with the process gas at a suitable time, this procedure also being referred to as reactive cathode sputtering.

The novel, sheet-like, multilayer, magneto-optical recording materials furthermore contain a base which is transparent to light and a thermally alterable, 10–100 nm thick recording layer of an amorphous lanthanide transition metal alloy, the anticorrosion layer to be used according to the invention being present on the base remote side of the recording layer. Further layers, such as conventional reflective layers and/or interference layers, may be located between the novel anticorrosion layer and the recording layer. Moreover, further conventional interference layers can be arranged between the base which is transparent to light and the recording layer.

Examples of suitable bases which are transparent to light are films, sheets or disks of electrically nonconductive, optically transparent materials, such as polyethylene terephthalate, polycarbonate, polymethyl methacrylate or glass, the disks being preferred. The surface of these disks may be structured and may contain, for example, tracks. The diameter of such disks is usually 90 or 130 mm.

Examples of suitable amorphous lanthanide transition metal alloys are the conventional GdCe, GdFe, TbFe, DyFe, GdTbFe, TbDyFe, GdFeCo, TbFeCo, GdTbFeCo or NdDyFeCo alloys, which may contain further suitable components, such as boron, phosphorus, titanium, antimony or bismuth.

The novel recording materials can be produced by the same techniques as those used for the production of the anticorrosion layers. Usually, the individual layers of the novel recording material are applied to the base via the gas phase, in the desired sequence, amount and thickness, after which a defined magnetization oriented at right angles to the layer surface is induced in the recording layer.

Data in the form of magnetically reversed spots can be recorded on the recording materials in a conventional manner from the side carrying the light-transparent base, with the aid of a pulse-coded write laser beam which is focused on the recording layer, strikes the said layer at right angles and has a wavelength $\lambda$ of less than 1,000 nm. Thereafter, the data can be read with the aid of a continuous-wave laser beam which is focused on the data-carrying recording layer and strikes the said layer at right angles, the light reflected by the recording layer itself or by the reflective layers being collected, analysed and converted into signals. In the case of the novel disks, the conventional laser-optical disk drives having laser-optical heads which contain semiconductor lasers can be used for this purpose.

The novel recording materials have particular advantages over the prior art. For example, they possess greater sensitivity than known recording materials, and data can therefore be recorded on the novel recording materials using lower laser power. Novel magneto-optical disks can therefore be written at higher disk speeds than known disks, using the same laser power. Their bit density too is substantially higher than that of the prior art. On reading, they give undistorted signals and have a signal/noise ratio of more than 55 dB. Even after a storage time of more than 1,000 hours at 70° C. and a relative humidity of 90%, the bit error rate is not increased, i.e. there is no loss of information. The recording materials have a scratch-resistant, hard, firmly adhering and mechanically strong anticorrosion layer which is not brittle and excellently shields the air-sensitive and water-sensitive recording layers. Moreover, the optical, mechanical and adhesion properties of the anticorrosion layers can be adapted to the other layers in an excellent manner.

EXAMPLES

EXAMPLES 1 TO 4

Production and properties of novel magneto-optical disks having multistratum anticorrosion layers The individual layers were applied from the gas phase, in the desired sequence and thickness, to four polycarbonate disks having a diameter of 130 mm and containing tracks, the disks being rotated. The anticorrosion layers were deposited by cathode sputtering of the relevant metal and admixing of carbon, oxygen and/or nitrogen via the gas phase. In this procedure, the conditions were chosen so that the compositions of the anticorrosion layers stated in Table 1 resulted. In Examples 1 and 4, the uppermost stratum (alumina) was produced by oxidation of the aluminum stratum with air. Table 1 gives information about the composition of the disks produced.

The recording layers of the disks obtained in this manner were magnetized at right angles to their surface and data was recorded on the said disks with the aid of a conventional laser-optical disk drive. A pulse-coded GaAlAs semiconductor laser which emitted linearly polarized light of wavelength $\lambda = 830$ nm was used. Both the bit length, ie. the spot diameter, and the bit spacing, ie. the distance from spot to spot, were about 1 $\mu$m.

To read the recorded data via the Kerr effect (Examples 1 and 2) or via the Faraday effect (Examples 3 and 4), the GaAlAs semiconductor laser was used in continuous-wave operation with a light output of less than 1 mW. The uncorrected bit error rate was determined in a conventional manner by means of a time interval analyzer (TIA). The disks were read immediately after the recording procedure (first reading), then stored for 1,000 hours at 70° C. and a relative humidity of 90% and then read again (second reading). The relevant results are shown in Table 2.

COMPARATIVE EXPERIMENTS A AND B

Production and properties of known recording materials

Two disks which were similar in structure and composition to the samples A-2 and B-5 disclosed in DE-A-33 35 689 were produced by the method stated in Examples 1 to 4. Table 1 compares the structure of the comparison disks with that of the novel disks.

The known disks were magnetized, data was recorded on the said disks and the latter were read and tested, these steps being carried out as described in Examples 1 to 4. In Table 2, the experimental results obtained are compared with the values from Examples 1 to 4.

The comparison shows that the recording materials of known composition were inferior to the novel recording materials in terms of the shelf life, this being evident from the substantially increased bit error rate of the known recording materials.

TABLE 2

| | Experimental results | |
|---|---|---|
| | Bit error rate (uncorrected) | |
| Example | 1st reading | 2nd reading |
| 1 | $10^{-5}$ | $10^{-5}$ |
| 2 | $10^{-5}$ | $10^{-5}$ |
| 3 | $10^{-5}$ | $10^{-5}$ |
| 4 | $10^{-5}$ | $10^{-5}$ |
| Comparative experiment | | |
| A | $10^{-5}$ | $2 \times 10^{-4}$ |
| B | $10^{-5}$ | $6 \times 10^{-4}$ |

I claim:

1. A sheet-like, multilayer, magneto-optical recording material which has a base which is transparent to light, a thermally alterable recording layer of an amorphous lanthanide transition metal alloy and, on the side of the recording layer remote from the base, a multistream anticorrosion layer which
   (a) is from 30 to 150 nm thick and
   (b) consists of two or more components which
   (c) are present in four or more separate strata, each consisting of one of the components,
   (d) one or more of the components being selected from the group consisting of the elements boron, aluminum silicon, titanium, zirconium, hafnium, vanadium, niobium, tantalum, chromium, molybdenum and tungsten,
   (e) one or more of the other components being selected from the group consisting of the carbides, nitrides and oxides of these elements (d),
   (f) directly adjacent strata always consisting of components which differ from one another and having at least one transition zone interposed between at least two strata, wherein the composition of one stratum changes gradually into the composition(s) of the adjacent stratum of the adjacent strata, the theoretical boundary between the said strata having a transition zone interposed between them being defined as the plane in which the carbon, nitrogen or oxygen content of a carbide, nitride or oxide stratum just reaches 50% of the relevant stoichiometric value, the thickness of one of the said strata being defined as the distance extending from one theoretical boundary to the next, and the thickness of a transition zone being defined as the

TABLE 1

Structure and composition of novel disks and disks not according to the invention

| Example | Interference layer 1 (on the base) (nm) | Recording layer (nm) | Interference layer 2 (on the recording layer) (nm) | Reflective layer (nm) | Anticorrosion layer: Strata | | | | | Transition zones (nm) | Total thickness (nm) |
|---|---|---|---|---|---|---|---|---|---|---|---|
| | | | | | 1 (nm) | 2 (nm) | 3 (nm) | 4 (nm) | 5 (nm) | | |
| 1 | SiO (80) | TbDyFe (80) | — | — | Al (20) | AlN (20) | Al (20) | $Al_2O_3$ (10) | — | (5) | (70) |
| 2 | SiO (80) | TbDyFe (90) | — | — | $Al_2O_3$ (20) | Al (20) | AlC (20) | Al (10) | $Al_2O_3$ (10) | (8) | (80) |
| 3 | SiO (80) | TbDyFe (25) | AlN (100) | Al (500) | SiN (20) | SiC (20) | Si (10) | $SiO_2$ (20) | — | (5) | (70) |
| 4 | SiO (80) | TbDyFe (20) | AlN (300) | Al (500) | TiN (20) | $TiO_2$ (20) | Ti (20) | $TiO_2$ (20) | — | (5) | (80) |
| Comparative experiment | | | | | | | | | | | |
| A | | TbDyFe (60) | $TiO_2$ (200) | — | $Al_2O_3$ (300) | — | — | — | — | | (300) |
| B | | TbDyFe (25) | $CeO_2$ (100) | Al (500) | CrN (300) | — | — | — | — | | (300) | distance extending from the plane in which the carbon, nitrogen or oxygen content of a carbide, nitride or oxygen stratum just reaches 90% of the relevant stoichiometric value, to the plane in which this relevant value is just 10%.

2. The sheet-like, multilayer, magneto-optical recording material of claim 1, wherein the two parts of one transition zone in two different strate are of the same thickness.

3. The sheet-like, multilayer, magneto-optical recording material of claim 2, wherein the thickness of such a part of the transition zone in a stratum does not exceed 75% of the thickness of the stratum.

4. The sheet-like, multilayer, magneto-optical recording material of claim 2, wherein the thickness of such a part of the transition zone in a stratum does not exceed 50% of the thickness of the stratum.

5. The sheet-like, multilayer, magneto-optical recording material of claim 1, wherein the two parts of one transition zone in two different strata are of a different thickness.

6. The sheet-like, multilayer, magneto-optical recording material of claim 5, wherein the thickness of such a part of the transition zone in a stratum does not exceed 75% of the thickness of the stratum.

7. The sheet-like, multilayer, magneto-optical recording material of claim 5, wherein the thickness of such a part of a transition zone in a stratum does not exceed 50% of the thickness of the stratum.

8. The sheet-like, multilayer, magneto-optical recording material of claim 1, wherein the separate strata of the anticorrosion layer have about the same thickness.

9. The sheet-like, multilayer, magneto-optical recording material of claim 1, wherein the uppermost strata of the anticorrosion layer is an oxide stratum.

10. The sheet-like, multilayer, magneto-optical recording material of claim 9, having an element stratum below the oxide stratum.

11. The sheet-like, multilayer, magneto-optical recording of claim 1, wherein a single element is used as the component (d) and the carbides, nitrides and/or oxides of this element are used as components (e).

12. The sheet-like, multilayer, magneto-optical recording material of claim 1, wherein the anti-corrosion layer consists of three components which are present in four or five separate strata, one of the components being selected from the group consisting of aluminum, silicon and titanium and the other two components being selected from the group consisting of boron carbide, aluminium carbide, silicon carbide, titanium carbide, boron nitride, aluminum nitride, silicon nitride, titanium nitride, alumina, silica and titanium oxide.

13. The sheet-like, multilayer, magneto-optical recording material of claim 12, wherein the said two other components are selected from the group consisting of alumina, silica and titanium oxide.

14. The sheet-like, multilayer, magneto-optical recording material of claim 7, wherein the thickness of each stratum in the multistratum anticorrosion layer is from 10 to 20 nm and the thickness of each transistion zone is from 5 to 8 nm.

* * * * *

UNITED STATES PATENT AND TRADEMARK OFFICE
CERTIFICATE OF CORRECTION

PATENT NO.  : 4,994,330

DATED       : February 19, 1991

INVENTOR(S) : Helmut Steininger

It is certified that error appears in the above-identified patent and that said Letters Patent is hereby corrected as shown below:

Col. 8, line 19, (claim 1) "multistratum" should read --multistrata--;
      line 27, (claim 1) insert --,-- between "aluminum" and "silicon".

Col. 10, line 11, (claim 11) "i" should read --1--;
      line 29, (claim 14) "7" should read --1--.

Signed and Sealed this

Eleventh Day of August, 1992

Attest:

DOUGLAS B. COMER

*Attesting Officer*     *Acting Commissioner of Patents and Trademarks*